United States Patent [19]

Simms

[11] 4,339,256

[45] Jul. 13, 1982

[54] METHOD OF MAKING POLARIZED OPHTHALMIC GLASS

[76] Inventor: Robert A. Simms, 6132 N. 77th Pl., Scottsdale, Ariz. 85253

[21] Appl. No.: 218,048

[22] Filed: Dec. 19, 1980

[51] Int. Cl.$^3$ .................. C03B 23/025; C03B 23/037
[52] U.S. Cl. .......................................... 65/32; 65/61; 65/64; 65/105; 65/106; 65/107
[58] Field of Search ................ 65/32, 61, 63, 64, 105, 65/106, 107, 62; 350/395

[56] References Cited

U.S. PATENT DOCUMENTS

| | | | |
|---|---|---|---|
| 3,653,863 | 4/1972 | Araujo et al. | 65/106 X |
| 3,765,853 | 10/1973 | Riebling | 65/32 X |
| 3,892,582 | 7/1975 | Simms | 65/32 X |
| 4,088,470 | 5/1978 | Bourg et al. | 65/105 |
| 4,304,584 | 12/1981 | Borrelli et al. | 65/32 X |

*Primary Examiner*—Richard V. Fisher
*Attorney, Agent, or Firm*—LaValle D. Ptak

[57] ABSTRACT

Polarized ophthalmic glass lenses are made from conventional ophthalmic glass. This is accomplished by heating a sheet of ophthalmic glass, which includes a reducible metal oxide as part of its composition, to its softening point in a reducing atmosphere for a time interval sufficient to reduce the metal oxide to metal to a predetermined depth on at least one surface of the sheet. Following this reduction of the metal oxide, the sheet is held at an elevated temperature to permit the reduced oxides to nucleate. Then, the sheet is stretched in one direction to elongate the nucleated metal particles in parallel lines. The glass then is shaped, cut into lenses, permitted to cool, and the outer surface of the lens blanks are ground and polished in a conventional manner, leaving the stretched elongated metal particles on the inner surface thereof to create polarized ophthalmic lenses.

17 Claims, No Drawings

METHOD OF MAKING POLARIZED OPHTHALMIC GLASS

BACKGROUND OF THE INVENTION

In order to more fully understand the invention disclosed and claimed herein, a brief discussion of polarization of light is considered helpful. Light generally travels in a transverse direction with electric vibrations perpendicular to the line of propogation of the light waves. Light is polarized linearly and horizontally when the electrical vibrations are horizontal; and when the vibrations are vertical, the light is considered to be polarized linearly and vertically. Thus, if a beam of light is passed through a first polarizer which divides the light into two components, one transmitted or passed through the polarizer while the other one is blocked, the remaining light has either horizontal or vertical polarization. If this polarized light subsequently is passed through a second polarizer maintained parallel to the first one, the polarized light all is transmitted through the second polarizer. If, however, the second polarizer is rotated, the amount of light passed through it decreases proportional to the amount of rotation of the second polarizer. When the polarizers are at right angles to one another, all of the light theoretically is absorbed by the second polarizer.

This phenomenon is employed to substantial advantage in the use of polarized sunglasses to substantially reduce the annoying effects of glare, since reflected sunlight (glare) has its polarization rotated ninety degrees or at right angles to direct sunlight. The most common polarized sunglasses are made of stretched plastic material which has long, thin, parallel chains of iodine or similar material embedded in it to permanently polarize it. Sunglasses made of this material have become very popular, but suffer from a number of inherent disadvantages. The plastics have a low hardness, and therefore, a poor scratch resistence; so that unless a great deal of care is taken to avoid scratching them, lenses made of such plastics rapidly deteriorate to the point where they are unusable or should not be used by the wearer. In addition, these plastics have a low refractive index which prevents manufacture of prescription polarized sunglasses from them.

Prescription sunglasses have been developed using photochromic glasses, which include submicroscopic crystals of silver halides, such as silver chloride, silver chromide, or silver iodide, which become darker in color when the glass is subjected to actinic radiation, but which regain their original color (or clarity) when the radiation is removed or reduced. Such a photochromic glass is disclosed in the patent to Armistead et al, U.S. Pat. No. 3,208,860. A later patent to Hares et al, U.S. Pat. No. 4,190,451; discloses a photochromic glass which is described as also having the capability of being either thermally tempered or chemically strengthened to comply with present regulations in existence for use in ophthalmic applications. The glasses disclosed in both of these patents, however, are not polarized glasses, but simply exhibit the characteristics of becoming darker when exposed to actinic radiation, and then fading or returning to their original color when such radiation is removed.

The formation of photochromic glass of the type disclosed in the Armistead and Hares et al patents requires the deliberate introduction of silver halides into the glass along with small amounts of reducing agents. Bulk processing of the glass takes place since the silver halide crystals and the reducing agents are uniformly dispersed throughout the glass.

An improvement in the photochromic glasses described above is disclosed in the patents to Simms, U.S. Pat. No. 3,892,582, and U.S. Pat. No. 3,920,463. These patents both disclose processes for permanently tinting photochromic glass by heating the photochromic material in a reducing atmosphere, and while it is at an elevated temperature, irradiating it with ultraviolet irradiation. The change in the tint of the photochromic material is caused by the heating and is emphasized or darkened by the subsequent ultraviolet irradiation. The formation of the glasses described in the Simms patents includes the introduction of silver halides into the glass batch in a manner similar to the production of the photochromic glasses described in the Armistead and Hares et al patents. The improvement is in the introduction of a permanent overriding tint of varying intensity coupled with the photochromic characteristics of the glasses.

An effort to combine photochromic characteristics with polarization in ophthalmic lenses, and the like, is disclosed in the patent to Araujo, et al, U.S. Pat. No. 3,653,863. The glass described in the Araujo patent is made by introducing crystalline silver halide into the glass batch along with a small amount of low temperature reducing agents in the batch. When the batch is subjected to heat, the reducing agents are catalyzed and operate to reduce the silver halides to metal. Submicroscopic droplets are formed; and as the glass remains at elevated temperatures after the reduction, these droplets agglomorate to form larger balls or masses of silver (silver halide) droplets. The glass then is stretched to elongate the particles causing elongated fibrils all aligned in the same direction to be formed throughout the glass bulk.

Because a bulk process is employed in the Araujo patent, it is somewhat difficult to control the transmission characteristics of the completed lens. For example, it is possible for several fibrils of the elongated droplets to be aligned with or nearly aligned with one another throughout the thickness of the lens. The only fibrils, however, required for the polarization effect are the outer-most ones where the light enters the lens. The remaining fibrils simply reduce the transmission of light through the lens due to scattering and the like. This difficulty is inherent in the bulk effect technique which is employed in the Araujo method. The aligned lines of polarizing material are noncontributors to the polarizing effect and simply contribute to transmission losses. All of this is particularly significant if the intent is to manufacture a "clear", high transmission prescription ophthalmic lens or a photochromic lens where ranges of transmission have to be carefully controlled as the photochromic lens in a sunglass.

Accordingly, it is desirable to manufacture polarized ophthalmic lenses of high quality without the above disadvantages.

SUMMARY OF THE INVENTION

It is an object of this invention to provide an improved polarized glass.

It is another object of this invention to provide a method for making an improved polarized ophthalmic glass.

It is yet another object of this invention to make polarized ophthalmic glass using the same composition ordinarily employed for non-polarized ophthalmic glasses.

It is a further object of this invention to provide surface polarization for ophthalmic glasses.

In accordance with a preferred embodiment of this invention, a method of making polarized ophthalmic glass includes the step of first heating a sheet of ophthalmic glass, which includes a reducible metal oxide as part of its composition, to its softening point in a reducing atmosphere for a period of time sufficient to reduce the metal oxide to metal to a predetermined depth on at least one surface of the sheet. The glass sheet then is stretched in one direction to elongate the metal particles in parallel lines. After the stretching has been completed, the glass is cooled to set the elongated metal particles in the glass.

In a more specific embodiment for making ophthalmic lenses, the glass sheet is placed over a shaping fixture while the glass sheet is still at the softening temperature to permit the sheet to sag and conform to the curvature of the shaping fixture. The shaping fixture itself has a number of curved surfaces on it to form the curvature necessary for a corresponding number of lens blanks. After the sheet has conformed to the shaping fixture, the individual lenses are cut from the fixture. The glass then is permitted to cool to set the elongated metal particles in the glass of each of the individual lenses thus formed.

DETAILED DESCRIPTION

In accordance with the method of the present invention, any glass batch containing a reducible oxide and suitable for making ophthalmic lenses may be polarized without changing the starting composition of the ophthalmic glass batch in any manner whatsoever from present commonly used commercial glass compositions. A typical glass, which is well known, has the following composition:

| COMPONENT | PERCENT BY WEIGHT (APPROXIMATELY) |
|---|---|
| $SiO_2$ | 32 |
| $Na_2O$ | 1 |
| $K_2O$ | 6 |
| $Al_2O_3$ | 4 |
| ZnO | 1 |
| $TiO_2$ | 2 |
| BaO | 1 |
| PbO | 51 |
| $ZrO_2$ | 1 |
| $AS_2O_3$ | 0.5 |
| $Sb_2O_3$ | 0.5 |

Without degrading the ophthalmic characteristics of the glass in any way and without altering the desirable light transmission characteristics of such glass, it has been found that such standard ophthalmic glass (and other similar standard ophthalmic glass compositions) can be permanently polarized in a controlled and effective manner by heating the glass in a reducing atmosphere, permitting the reduced metal oxides (particularly lead oxide reduced to lead metal) which are formed to nucleate, and then stretching the glass ten to thirty times the original length while it is in the softened state to elongate the reduced metal particles. After this, the glass is allowed to cool and the stretched metal particles cause permanent surface polarization to take place.

The temperature to which the glass must be heated varies dependent upon the characteristics of the glass batch itself. Typically, such a temperature is between 300° C. to 600° C., or perhaps even above. The nucleation occurs at all of these temperatures, but the nucleation is faster at the higher temperatures. Ideally, the elongation or stretching of the glass to form the polarization lines of stretched lead typically is done at the minimum softening temperature for the particular glass formulation which is used.

The exact identity of the reducing atmosphere is not particularly critical (so long as it is gaseous at the processing temperature, of course), and reducing atmospheres of the type commonly used in the art are used with success in accomplishing the reduction of the metal oxides in the glass. Similarly, the temperature is not particularly critical, except that at higher temperatures the reduction and nucleation occurs more rapidly than at lower temperatures. As stated above, it also is desirable to effect the stretching of the glass at or near its lowest softening temperature in order to most effectively utilize the shear characteristics of the glass in stretching the metal particles.

In selecting the particular reducing atmosphere which is used, cost and safety are primary factors. Preferred reducing gases include hydrogen, carbon monoxide, cracked ammonia, and similar gases which may be used in pure form or mixed with an inert carrier gas. Because of its ready availability, hydrogen generally is employed as the reducing atmosphere. Although it is apparent that pure hydrogen may be used, the high danger of explosion and the relatively high cost of pure hydrogen as compared to many inert carrier gases, generally dictates the use of hydrogen in combination with an inert carrier gas. For practical purposes, the inert gas used is generally nitrogen because, again, it is readily available at relatively low cost. Obviously, oxygen should be kept out of the system to avoid the danger of explosion even when an inert gas carrier is used in conjunction with the hydrogen gas.

The ratio of the reducing gas to the inert gas carrier is not critical so far as the manner in which the process functions is concerned. From a practical standpoint, however, if extremely low proportions of reducing gas are employed, the process time is significantly increased without any accompanying benefit and results. Because of the time increase for low proportions of reducing gas, the cost of processing a given batch of glass is also increased and this is undesirable. It has been found that a ten percent (10%) hydrogen/ninety percent (90%) nitrogen (by volume) reducing atmosphere offers good results at reasonable processing times with a minimum of safety hazards. Actually, a range of five percent (5%) hydrogen/ninety percent (90%) nitrogen to fifteen percent (15%) hydrogen/eighty-five percent (85%) nitrogen is probably an ideal working range for the reducing atmosphere.

To minimize the danger of hydrogen build-up, if hydrogen is used as the active reducing component, and further to avoid temperature variations over the surface of the glass being processed, it is preferable to flow the reducing atmosphere over the surface of the glass under a slight positive pressure in either a semicontinuous or continuous system. Consequently, the excess reducing atmosphere is used to constantly flush the processing apparatus, avoiding hot spots on the surface of the glass and at the glass/reducing atmosphere interface. Highly turbulent conditions should be avoided, since these might cause "hot spots" or "cold spots" on the glass surface. To accomplish this, the pressure of the reducing atmosphere generally is maintained only slightly in excess of atmospheric pressure to ensure an even flow over the glass articles being processed.

The method of making ophthalmic polarized glass in accordance with the teachings of this invention can be practiced in batch, semicontinuous, or a continuous manner. Initially, the invention has been practiced in batch operations; but in full scale commercial operations, continuous processing is preferred.

By processing the glass as discussed above, it should be noted that the reduction process is confined to the immediate surface of the glass sheet or blank. Penetration typically is on the order of three to five microns; so that for the completed article, the stretched aligned polarizing medium is also confined to the surface. Typically, ophthalmic lenses are formed from ophthalmic blanks having the general overall lens shape. To complete a lens, the blank then needs contouring, either a prescription contour or a plano-plano contour, grinding and polishing; and, finally, the overall lens is shaped to a particular frame geometry to create the finished glasses.

Because of the substantial working of the surface of ophthalmic lens blanks, the polarizing process cannot be applied to either a prefinished blank or the finished lens. In the case of the blank, the grinding and polishing operations required for finishing would eliminate the surface polarizing medium from the lens. For finished lenses, the stretching step which necessarily must be made in order to create the polarizing lines in the glass would grossly distort the finely processed curvature of the lens.

Consequently, it has been found that the reduction and stretching of the glass must be introduced into the ophthalmic glass at a unique point in its processing. Instead of working on the lens blanks, the process is applied to planar sheets of ophthalmic glass. The thickness of these glass sheets is selected so that after it is stretched, the final necessary thickness for lens blanks is maintained. In addition, it should be noted that since there is always a grinding and finishing step necessary for the creation of prescription lenses, one surface of the planar sheet must be finished in a manner which precludes the necessity of any further polishing on that surface. Consequently, one surface (selected to be the inner surface of the finished lenses) is already provided with a final polished finish prior to the heating of the sheet in a reducing atmosphere and its subsequent stretching. Then at the proper temperature, the polarized sheet is placed with this surface over forming molds which shape the inner contour for the lens blanks. This inner contour, of course, is polarized and is the finished side of the sheet glass. The other or outer surface also is polarized; but since it is processed further by grinding and polishing prescription lenses, the polarization is removed from that surface for the creation of prescription lenses. The back or inner finished surface, however, remains polarized to accomplish the desired purposes.

In the case of the forming of plano-plano ophthalmic lenses or even plain sunglasses, the final finish can be applied to both surfaces of the sheet glass prior to its heating in a reducing atmosphere, stretching, and shaping over the mold; so that both surfaces will be polarizing surfaces in the completed lenses.

The process also may be applied to photochromic ophthalmic lenses of the types disclosed in the prior art.

A variation on the above manufacturing technique which may be eployed is to polarize a very thin sheet of plate glass separately from the prescription lens blanks. This very thin polarized glass sheet then is formed to the inner layer of the prescription semifinished lens, or it may be formed to the final outer surface, or both surfaces. The final processing step in such a method would be to fuse the thin polarized glass sheet to the ophthalmic lens by a suitable technique.

The invention is further illustrated by the following examples:

EXAMPLE I

A rectangularly shaped sample of glass three inches (3") by three inches (3") by one-fourth inch ($\frac{1}{4}$") was obtained having the following glass composition:

| INGREDIENT | WEIGHT PERCENT |
|---|---|
| $SiO_2$ | 55.9 |
| $Al_2O_3$ | 9.0 |
| $B_2O_3$ | 16.2 |
| LiO | 2.65 |
| NaO | 1.85 |
| PbO | 5.05 |
| BaO | 6.7 |
| ZnO | 2.3 |
| Ag | 0.16 |
| Cl | 0.29 |
| Br | 0.72 |
| CuO | 0.036 |
| F | 0.2 |

The sample was polished to a finished surface on its lower side. The sample was heated to a temperature of 500° C. and then subjected to a reducing atmosphere consisting of ten percent (10%) hydrogen and ninety percent (90%) nitrogen for a period of ten (10) minutes.

The ten percent (10%) hydrogen/ninety percent (90%) nitrogen atmosphere was then removed and replaced by a non-reducing atmosphere purge of one hundred percent (100%) nitrogen, and the sample was held in this atmosphere at the same temperature (500° C.) for another period of two (2) hours to nucleate the reduced oxides.

The glass sample was clamped to a fixed clamp at one end and heated to its softening temperature range (approximately 600° C.) at which range it began to deform (stretch) under its own weight. This stretching was allowed to continue until the sample was stretched to an overall length of forty (40) inches.

The stretched glass then was placed over a lens shaping fixture, heated to near the softening temperature of the glass, and was permitted to sag to conform to the desired lens curvature provided by the shaping fixture. The lens blanks then were cut from the fixture and permitted to cool.

Polarization efficiency was measured and found to be forty percent (40%) effective.

EXAMPLE II

The rectangularly shaped sample of glass, having the dimensions and composition of the glass used in Example I, was prepared by polishing its lower side to a finished surface. The sample then was clamped to a fixed clamp at one end.

The sample then was heated to a temperature of 550° C. and subjected to a reducing atmosphere consisting of ten percent (10%) hydrogen and ninety percent (90%) nitrogen for a period of forty (40) minutes.

The sample temperature was next increased to 600° C. at which temperature it began to deform (stretch) under its own weight. This stretching was allowed to continue until the sample was stretched to an overall length of forty (40) inches.

The stretched glass then was placed over a lens shaping fixture, heated to near the softening temperature of the glass, and was permitted to sag to conform to the desired lens curvation provided by the shaping fixture. The lens blanks then were cut from the fixture and permitted to cool.

Polarization efficiency was measured and found to be forty-three percent (43%) effective.

EXAMPLE III

A rectangularly shaped sample of glass, having the dimensions and compositions of Example I, was prepared by polishing its lower surface to a finished surface. The sample then was clamped to a fixed clamp at one end.

The sample then was heated to its softening temperature range (approximately 600° C.) and, simultaneously, subjected to a reducing atmosphere consisting of ten percent (10%) hydrogen and ninety percent (90%) nitrogen for a period of thirty (30) minutes. At the end of thirty (30) minutes the reducing atmosphere was replaced by a non-reducing nitrogen atmosphere, and the sample heating was continued until it had stretched to a length of forty (40) inches.

The sample next was placed over a lens shaping fixture, and heated to near the softening temperature of the glass. The glass was permitted to sag to conform to the desired lens curvation provided by the shaping fixture. The lens blanks were cut from the fixture and permitted to cool.

Polarization efficiency was measured and found to be twenty-eight percent (28%) effective.

Measurement of polarization efficiency in the foregoing examples was done in the following manner. A conventional polarizing filter (a Kalt p.1 φ 52) was placed in front of a light source and rotated; so that the transmitted light was a minimum. This meant that the transmitted light was polarized. The sample produced in each of the above Examples then was located in the beam of this polarized light and rotated through 360°. The transmission of light passing through the sample was plotted as a function of the angle of rotation to determine the maximum polarization efficiency according to the following formula:

$$P = (T1 - T2)/(T1 + T2)$$

where T1 equals the maximum light transmitted through the sample, and T2 equals the minimum light transmitted through the sample, as detected by a conventional light meter. No efforts were made in the foregoing Examples to process the glass sample for its optimum degree of polarization. The samples were made to determine and illustrate the concept of the invention.

To ascertain the depth of the penetration of the reducing agent and, therefore, the depth of the elongated polarizing elements in the completed stretched sample, the samples were broken to expose a cross-section through the optical axis. A high powered microscope with a calibrated reticle then allowed the measurement of the depth of penetration which, as stated previously, was found to be on the order of three to five microns.

The invention has been specifically described in conjunction with preferred embodiments as set forth in both the general description and in the specific examples. It is to be understood, however, that the Examples given are to be considered illustrative of the invention and not as limiting. These Examples were not optimized for maximum polarization efficiency. For example, various changes in the specific dimensions and compositions of the glass will occur to those skilled in the art. Similarly, various temperatures may be employed without departing from the concepts of the invention. For example, a relatively wide range of temperatures may be utilized to practice the invention, and nucleation of the reduced metal oxides occur at all of these temperatures. The higher temperatures, however, result in faster nucleation than occurs at the lower temperatures. Also, various types of and compositions of reducing atmospheres may be employed to reach the same results which are attained in the Examples specifically discussed above. Such variations will not depart from the true spirit and scope of the invention.

I claim:

1. A method of making polarized ophthalmic glass, comprising the steps of:
   heating a sheet of ophthalmic glass, including a reducible metal oxide as a part of its composition, to its softening point in a reducing atmosphere for a predetermined period of time sufficient to reduce said metal oxide to metal particles to a predetermined depth less than the thickness of said sheet on at least one surface of said sheet;
   stretching said sheet in one direction to elongate said metal particles in parallel lines; and
   cooling the glass to set the elongated metal particles in the glass.

2. The method according to claim 1 wherein the reducing atmosphere consists of a hydrogen/nitrogen atmosphere.

3. The method according to claim 2 wherein the temperature to which the glass sheet is heated is three hundred degrees Centigrade (300° C.) to six hundred degrees Centigrade (600° C.) and the predetermined period of time is at least ten (10) minutes.

4. The method according to claim 1 further including the steps of removing the reducing atmosphere following the heating of said sheet of glass therein for said predetermined period of time and holding said sheet of glass in a nonreducing atmosphere at its softening temperature for a second predetermined period of time prior to stretching said sheet.

5. The method according to claim 4 wherein said second predetermined period of time is substantially two (2) hours.

6. The method according to claim 1 further including the step of shaping the glass to a predetermined curvature following stretching of said sheet and prior to cooling the glass.

7. The method according to claim 6 wherein said sheet is stretched to elongate it from ten (10) to thirty (30) times its original length.

8. The method according to claim 1 wherein said sheet is stretched to elongate it from ten (10) to thirty (30) times its original length.

9. A method of making polarized ophthalmic lenses, comprising the steps of:

heating a sheet of ophthalmic glass, including a reducible metal oxide as a part of its composition, to its softening point in a reducing atmosphere for a predetermined period of time sufficient to reduce said metal oxide to metal particles to a predetermined depth on at least one surface of said sheet;

stretching said sheet in one direction to elongate said metal particles in parallel lines;

placing the stretched glass sheet over a shaping fixture while said glass sheet is at the softening temperature and permitting said sheet to conform to the curvature of said shaping fixture;

cutting individual lenses from the glass after shaping on said shaping fixture; and cooling the glass to set the elongated metal particles in the glass of the individual lenses thus formed.

10. The method according to claim 9 wherein said at least one surface comprises the inner surface of each of the lenses thus formed and further including the step of grinding and polishing the outer surfaces of such lenses to particular prescriptions following the cooling of the glass.

11. The method according to claim 9 wherein the reducing atmosphere comprises a hydrogen/nitrogen reducing atmosphere, and wherein said predetermined period of time is at least ten (10) minutes.

12. The method according to claim 9 wherein the step of stretching said sheet takes place after said predetermined period of time and said sheet is stretched from ten (10) to thirty (30) times its original dimension in said one direction.

13. The method according to claim 9 further including the step of removing the reducing atmosphere after said predetermined period of time and holding said sheet of glass at said softening temperature for a second predetermined period of time to nucleate the reduced metal oxides prior to stretching said sheet of glass.

14. The method according to claim 9 wherein the glass is heated to a temperature ranging from three hundred degrees Centigrade (300° C.) to six hundred degrees Centigrade (600° C.) to soften the glass, and wherein said predetermined time is sufficient further to allow the reduced metal oxide to nucleate and wherein said stretching of said sheet takes place following such nucleation.

15. The method according to claim 14 wherein the reducing atmosphere comprises a hydrogen/nitrogen reducing temperature, and wherein said predetermined period of time is at least ten (10) minutes.

16. The method according to claim 15 wherein the step of stretching said sheet takes place after said predetermined period of time and said sheet is stretched from ten (10) to thirty (30) times its original dimension in said one direction.

17. The method according to claim 16 wherein said at least one surface comprises the inner surface of each of the lenses thus formed and further including the step of grinding and polishing the outer surfaces of such lenses to particular prescriptions following the cooling of the glass.

* * * * *